(No Model.) 3 Sheets—Sheet 1.

D. C. FRAZEUR.
BICYCLE GEARING.

No. 513,101. Patented Jan. 23, 1894.

WITNESSES
Geo. E. Freeh.
Roland J. Fitzgerald.

INVENTOR
D. C. Frazeur
By Lehmann Pattison Nesbit
Attys (No Model.) 3 Sheets—Sheet 2.
D. C. FRAZEUR.
BICYCLE GEARING.
No. 513,101. Patented Jan. 23, 1894.
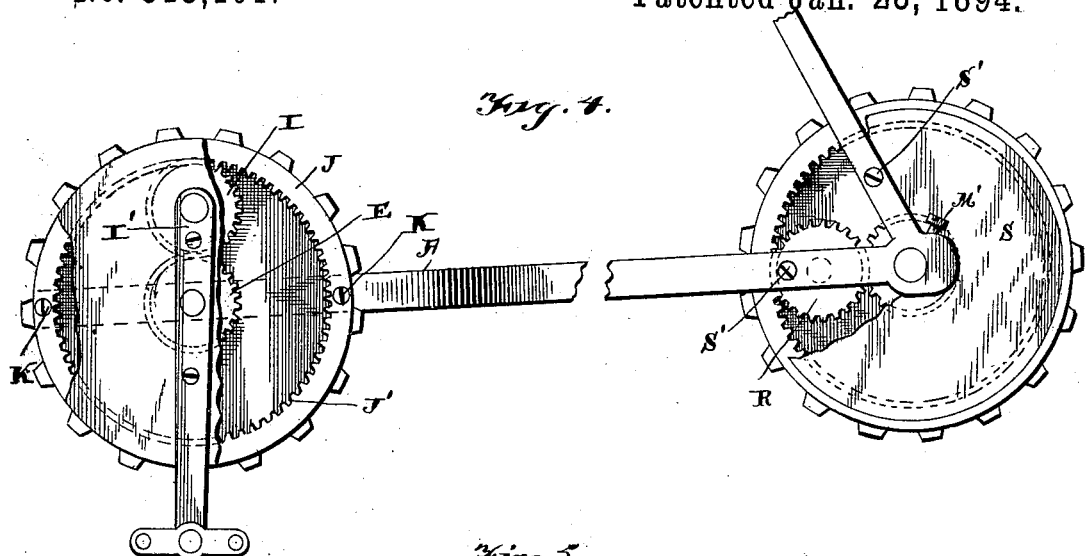
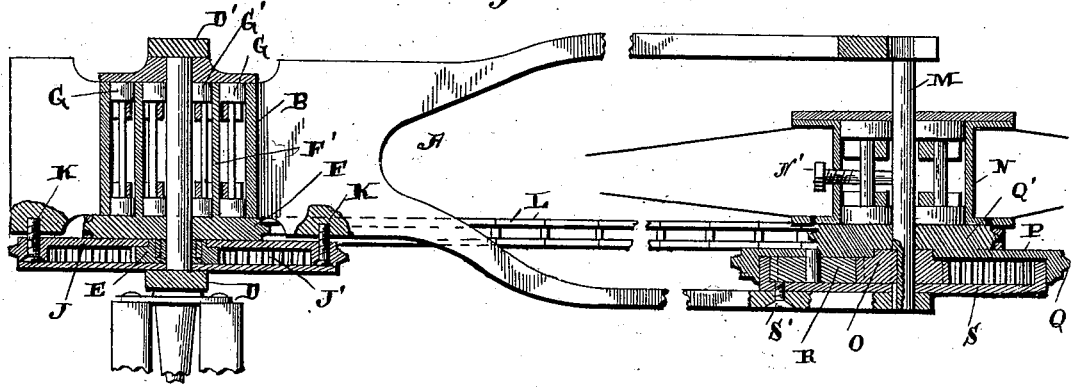
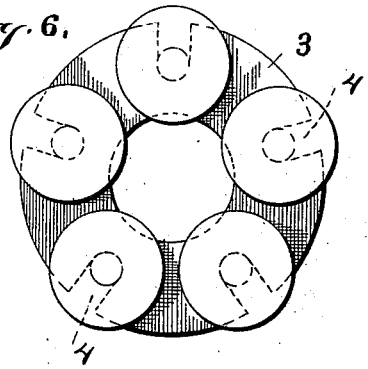
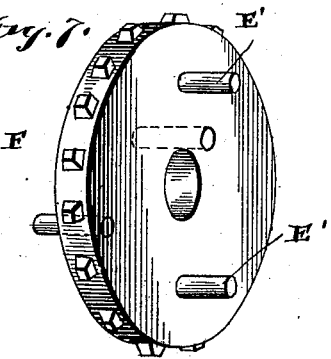
Witnesses:
Geo. E. Frech
Roland A. Fitzgerald
Inventor:
D. C. Frazeur
By Lehmann Pattison & Nesbit
Attys.

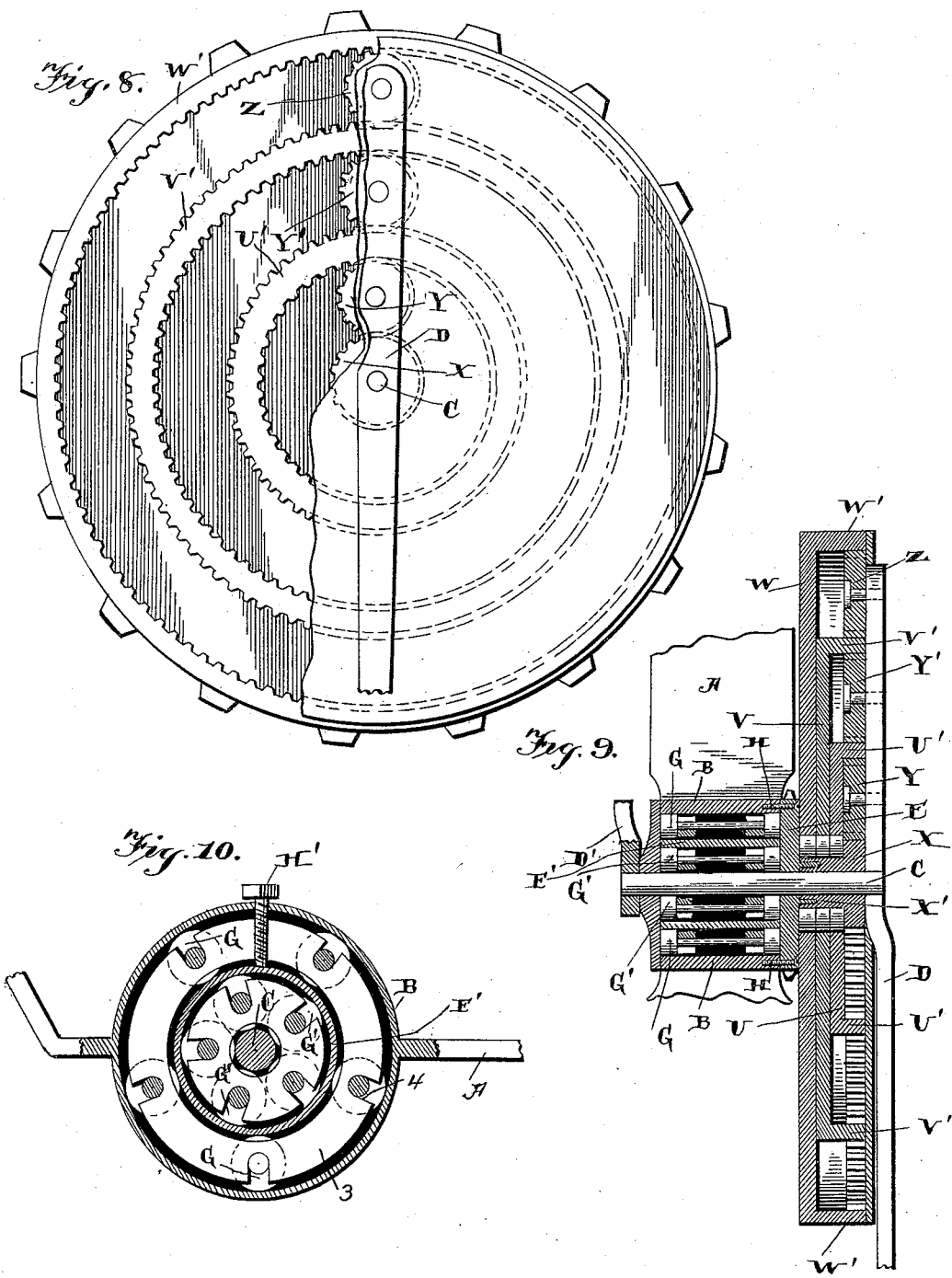

UNITED STATES PATENT OFFICE.

DAVID C. FRAZEUR, OF NEW MARKET, NEW JERSEY.

BICYCLE-GEARING.

SPECIFICATION forming part of Letters Patent No. 513,101, dated January 23, 1894.

Application filed December 23, 1892. Serial No. 456,173. (No model.)

*To all whom it may concern:*

Be it known that I, DAVID C. FRAZEUR, of New Market, in the county of Middlesex and State of New Jersey, have invented certain new and useful Improvements in Bicycle-Gearing; and I do hereby declare the following to be a full, clear, and exact description of the invention, such as will enable others skilled in the art to which it pertains to make and use it, reference being had to the accompanying drawings, which form part of this specification.

My invention relates to an improvement in bicycle gearing; and it consists in the novel combination and arrangement of parts which will be fully described hereinafter, and more particularly referred to in the claims.

The object of my invention is to provide an improved gearing whereby a given movement of the pedals will produce a much faster motion at the driving sprocket.

Figure 1:
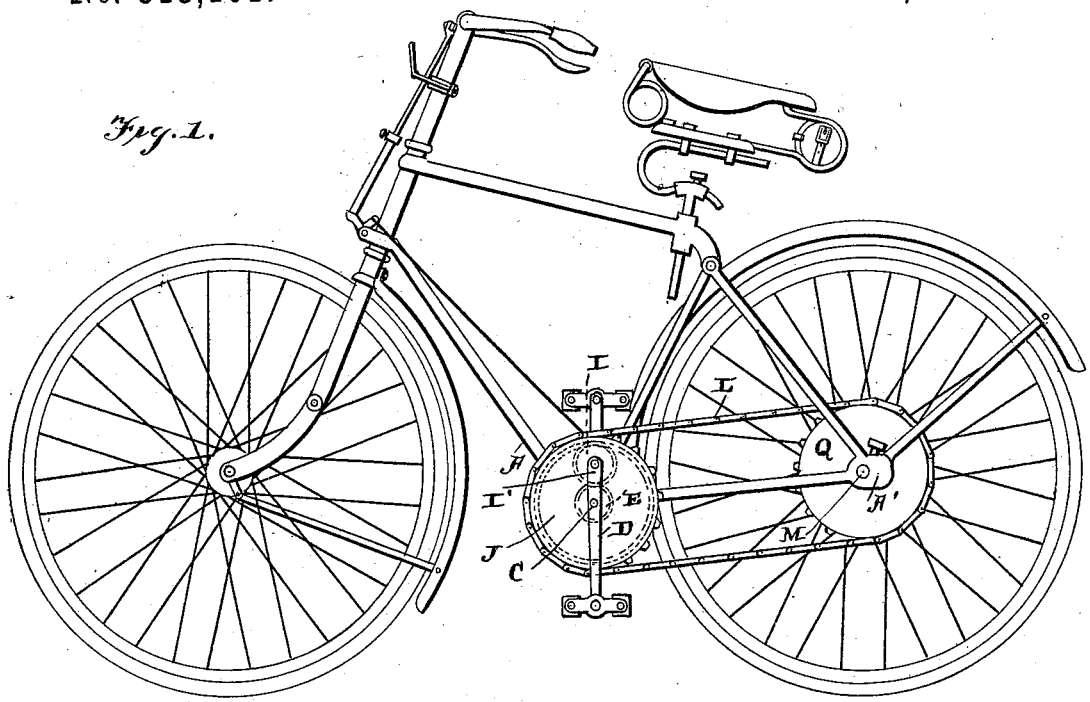
Figure 2:
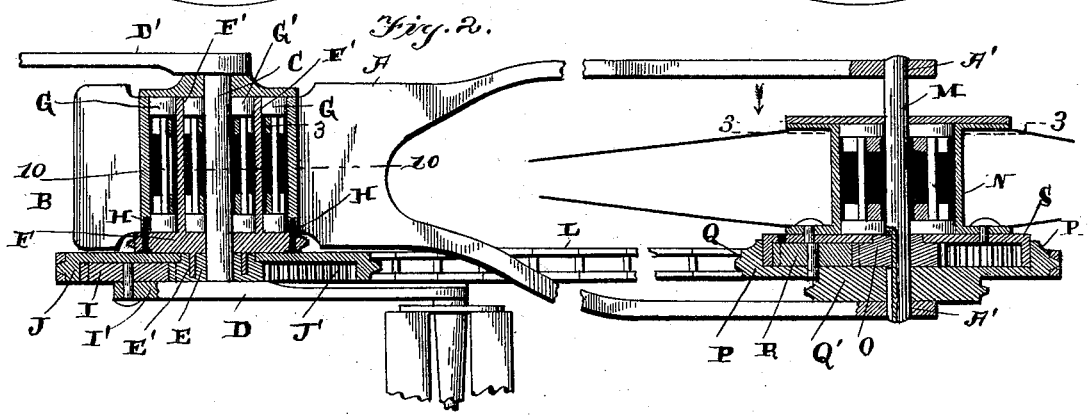
Figure 3:
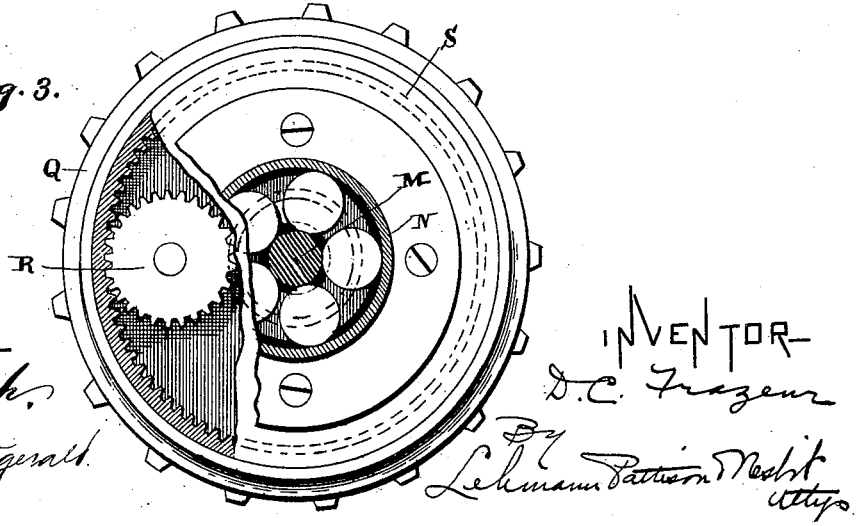

Referring now to the accompanying drawings,—Figure 1 is a side elevation of a bicycle provided with my improved gearing. Fig. 2 is a longitudinal sectional view of the gearing therefor. Fig. 3 is a sectional view on line 3—3 of Fig. 2. Fig. 4 is a side elevation of a modified form of gearing. Fig. 5 is a longitudinal sectional view of the same. Fig. 6 is an end view of one of the roller bearings. Fig. 7 is a perspective view of the smaller driving sprocket. Fig. 8 is a side elevation of a modified form of gearing for the crank shaft. Fig. 9 is a sectional view of the same.
Fig. 10 is a sectional view on line 10—10 of Fig. 2.

A, designates the bicycle frame and formed thereon is the bearing inclosing casing B. Extending through this casing is the pedal shaft C, and secured to the respective ends of the latter are the pedal arms D, and D'.

Loosely mounted on the shaft C is the small gear wheel E, and immediately behind this gear and on the shaft is the sprocket wheel F. The said gear wheel and sprocket are made rigid or secured together by pins E' extending from the sprocket into the gear. The sprocket F, is formed with a hub F' which extends into the casing B, being separated from the inner wall of the latter by the roller bearings G, while between the said hub and the shaft C, which latter extends through it, are located the bearings G', thus reducing all friction when the several parts are in motion. In the construction now under consideration the sprocket F, is made rigid with the frame, by screws H, while the hub of the said sprocket is clamped by the depending set screw H' shown in Fig. 10. The gear E, being connected to the sprocket F, will also be held stationary as will be understood.

Journaled to the short end I' of the pedal arm D, is the small gear I, which meshes with the gear E. Encircling the gear E, is the large sprocket wheel J, having a recessed side and the periphery of the recess thus formed is cogged as at I' and the said cogs are engaged by the gear I. Thus the said last named gear at one side is in engagement with the stationary pinion E, and at the opposite side is in engagement with the revoluble sprocket J. The inner circumference of the sprocket wheel J, is just three times that of the pinion I, so that in one revolution of the pedals and one complete rotation of the pinion I, the said sprocket J, will be revolved one and one-third times so that with three revolutions of the pedals and a like number of rotations of the said pinion the sprocket will be revolved four times. Thus the speed of the driving sprocket is materially greater than that of the pedals. Now for securing a much greater speed for the driving sprocket I fasten or secure the sprocket J to the frame A, by means of screws K, at the same time removing the screws H, and withdrawing the set screw H', thus freeing the small sprocket F, and the gear E, while the drive chain L, is placed on said sprocket, all of which is shown in Fig. 5. Thus the inner cogged surface J' of the large sprocket J, forms the fixed member against which the pinion I, pushes while the small gear E, which in the other described construction performed this office is now revolved together with the sprocket F. By this arrangement of the gearing the said sprocket is revolved four times with every revolution of the pedals. As will be seen the gearing for each motion is easily carried at all times so that the change from one to the other can be effected with little trouble.

I provide gearing for the rear wheel of the machine which gives to the latter an increased motion with relation to the drive chain just as the motion of the driving sprocket is increased over the motion of the pedals.

Referring now to Figs. 1 and 2 the rear axle M, is clamped in bearings A', at the rear end of the forked frame A. N, is the hub of said wheel mounted on said axle upon which it turns through the medium of the roller bearings shown. O, is a small gear feathered to shaft or axle M. Loosely mounted on said axle is the member P, having formed thereon the large sprocket Q, and the small sprocket Q'. The inner side of this member is recessed and journaled therein is the pinion R. Secured to the hub N, is the interiorly cogged plate S, which extends into the recessed member P, and the cogs of the said plate are engaged by the pinion R. Thus one side of the said pinion is in engagement with the fixed pinion or gear O, while its opposite side engages the revoluble plate S, which travels with the wheel hub as described. The sprocket Q, and the driving sprocket J, are of the same diameter and the arrangement just described is used preferably with the one-third increase construction of the driving mechanism before described. Now for every revolution of the sprocket Q and complete revolution of the pinion R, around the shaft or axle M, the wheel hub N, moves around one and one-third times.

Referring now to Fig. 5 the rear gearing is adapted to operate in connection with what I will term the "four motion" of the driving gearing. This is effected by reversing upon the axle M, the position of the member P, and the recessed plate S, as shown in Fig. 5, so that the said plate is brought outward against the frame A, while the small sprocket Q', rests against the hub N, and in line with the sprocket F, of the driving gearing. The set screws M', which clamp the axle M, to the frame are loosened while the hub N, is made rigid with the axle M, by a set screw N', so that the said axle revolves freely in the frame bearings while the wheel is clamped thereto, an operation just the opposite of that effected in the above described one and one third motion. The plate S, is then secured to the frame A, by screws S', thus forming the fixed member against which the pinion R, pushes while the gear O, and with it the hub N, revolves. In this motion the drive chain L, moves around the small sprockets as shown. Now with every revolution of the member P, the gear O, and with it the hub N, is revolved four times so that this increase added to the corresponding increase at the driving gearing effects sixteen revolutions of the rear wheel to every single revolution of the pedals.

I here show and describe the corresponding driving and rear wheel gears as used together as the best results are secured by so employing them but a slow driving gear may be used in connection with a faster rear wheel gear or vice versa if desired. Two drive chains of different lengths may be provided, one for each motion, or one alone may be used and a section of the same taken out for operating the last described arrangement of gearing.

Figs. 8 and 9 illustrate a modification which amounts simply to a multiplication of the construction shown in Fig. 2, whereby a greatly increased speed is secured. On this form of gearing I employ three plates U, V, and W, having peripheral flanges U', V', and W', respectively. The first two flanges are cogged on both edges while the last named which constitutes the driving sprocket is only cogged on the inner edge. Loosely mounted on the shaft C, is the pinion X having a reduced inner end X', and upon this extension the several plates bear through the medium of ball bearings. This pinion corresponds with the pinion E, of the construction shown in Fig. 2. Journaled to the extended end of the pedal arm D, are three pinions, the first of which Y, being located between the pinion X, and the flange U', while the second pinion Y', is located between and meshes with the cogs on the outer edge of the flange U', and the ones on the inner side of the flange V', and the outer pinion Z, is located between the outer flange W', and the flange V'. Now the motion of the first plate U, is about the same with relation to the pedal as the sprocket J, of Fig. 2, that is it moves around about one and one-third times while the pedal makes one revolution. The pinion Y', increases the motion of the plate V through its connection with the plate U, and in like manner the speed of the sprocket plate W, is more than that of the plate V, owing to its connection with the latter through the pinion Z. Thus it will be seen a very fast motion is obtained from a comparatively slow initial movement. The rollers of the respective sets of bearings are held at equal distances apart by the rings 3, having slots 4 into which the rollers are dropped. By the use of these rings a less number of rollers is required and they are always in order.

Having thus fully described my invention, what I claim as new, and desire to secure by Letters Patent, is—

1. An improved gearing comprising a bearing, a shaft extending therethrough. An arm secured to the shaft, a pinion journaled to the arm. A sprocket wheel concentric with the shaft having a cogged surface which is engaged by the said pinion, a second sprocket wheel concentric with the shaft and which carries a cogged surface which is engaged by the said pinion, and a means for holding either of the sprockets stationary while the other is revolved, substantially as shown and described.

2. An improved gearing comprising a bearing, a shaft extending therethrough an arm secured to the shaft, a pinion journaled thereto, a sprocket wheel concentric with the shaft having a cogged surface which is engaged by said pinion, a second sprocket wheel concentric with the shaft and which carries a cogged surface which is engaged by the said pinion at a point opposite its engagement with the first named sprocket, a hub extending from the last named sprocket into the said bearing, friction rollers arranged between the shaft and the hub and between the latter and the wall of the bearing, and a means for holding either of the sprockets stationary while the other is revolved, substantially as shown and described.

3. An improved gearing comprising a bearing, a shaft extending therethrough, a pinion carrier secured to the shaft, a pinion thereon, a sprocket wheel concentric with the shaft, a concave rack carried by the sprocket and engaged by said pinion, a second sprocket wheel concentric with the shaft, a gear carried by the sprocket which the said pinion also engages, and a means for holding either sprocket stationary while the other is revolved, substantially as shown and described.

4. An improved gearing comprising a bearing, a shaft extended therethrough, a sprocket concentric with the shaft, a cogged surface carried by the sprocket a second sprocket concentric with the shaft, a cogged surface carried by the same, a gearing interposed between the cogged surfaces of the said sprockets, and a means for holding either sprocket stationary, while the other is revolved, substantially as shown and described.

In testimony whereof I affix my signature in presence of two witnesses.

DAVID C. FRAZEUR.

Witnesses:
W. R. CODINGTON,
JOHN KIRCH, Jr.